US010703376B2

(12) United States Patent
Coerman et al.

(10) Patent No.: US 10,703,376 B2
(45) Date of Patent: Jul. 7, 2020

(54) CONTROLLING THE AUTOMATIC STARTING OF A MOTOR VEHICLE UPHILL IN A μ SPLIT SITUATION

(71) Applicant: FORD GLOBAL TECHNOLOGIES, LLC, Dearborn, MI (US)

(72) Inventors: Cyril Coerman, Leverkusen (DE); Lucian Lippok, Cologne (DE); Robert Barend Ter Waarbeek, Pulheim (DE); Georg Johann Maurer, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 95 days.

(21) Appl. No.: 16/025,184

(22) Filed: Jul. 2, 2018

(65) Prior Publication Data
US 2019/0023275 A1   Jan. 24, 2019

(30) Foreign Application Priority Data
Jul. 19, 2017   (DE) .......................... 10 2017 212 385

(51) Int. Cl.
*B60W 40/064*   (2012.01)
*B60W 30/18*   (2012.01)
*B60W 40/068*   (2012.01)

(52) U.S. Cl.
CPC .... *B60W 40/064* (2013.01); *B60W 30/18027* (2013.01); *B60W 30/18172* (2013.01);
(Continued)

(58) Field of Classification Search
CPC ......... B60W 40/064; B60W 30/18027; B60W 30/18172; B60W 40/068;
(Continued)

(56) References Cited

U.S. PATENT DOCUMENTS

2003/0229439 A1* 12/2003 Polzin ..................... B60T 8/175
701/82
2013/0231837 A1   9/2013 Holbrook et al.
(Continued)

FOREIGN PATENT DOCUMENTS

DE   102006021652 A1   11/2006
DE   102009022303 A1   3/2011
(Continued)

OTHER PUBLICATIONS

Autocar Pro News Desk, "Mercedes-Benz celebrates 20 years of life-saving ESP," http://www.autocarpro.in/news-international/mercedes-benz-celebrates-life-saving-esp-8331, May 4, 2015, 10 pages.

Primary Examiner — Anne Marie Antonucci
(74) Attorney, Agent, or Firm — Vincent Mastrogiacomo; Brooks Kushman P.C.

(57) ABSTRACT

A method is described for controlling the automatic starting of a motor vehicle comprising an electronically controllable locking differential, uphill in a split mu situation. The method comprises the following steps: determining the positive gradient of the underlying surface; defining an initial locking torque on the basis of the determined positive gradient and on the basis of a component of the torque which the vehicle requires to travel uphill with only the first driven wheel powered; calculating the slip ratio $SR_{xx}$ for the first driven wheel xx according to $SR_{xx}=(V_{xx}-V_{Ref})/V_{Crit}$ if the reference velocity $V_{Ref}$ is between 0 and a critical velocity $V_{Crit}$, and according to $SR_{xx}=(V_{xx}-V_{Ref})/V_{Ref}$ if the reference velocity $V_{Ref}$ is higher than the critical velocity $V_{Crit}$; and defining the locking torque of the electronically controllable locking differential on the basis of the slip ratio of the first driven wheel.

11 Claims, 5 Drawing Sheets

(52) U.S. Cl.
CPC ..... *B60W 40/068* (2013.01); *B60W 2520/266* (2013.01); *B60W 2520/28* (2013.01); *B60W 2552/15* (2020.02); *B60W 2710/125* (2013.01)

(58) Field of Classification Search
CPC ....... B60W 2520/266; B60W 2520/28; B60W 2550/142; B60W 2710/125; B60W 2550/148; B60W 2550/14; B60W 30/12; B60K 2023/046; B60K 23/04; B60K 23/0808
See application file for complete search history.

(56) References Cited

U.S. PATENT DOCUMENTS

2016/0356370 A1  12/2016  Richards et al.
2017/0015327 A1   1/2017  Henel et al.

FOREIGN PATENT DOCUMENTS

DE    102015212948 A1   1/2017
WO      2015110203 A1   7/2015
WO      2015199606 A1  12/2015

\* cited by examiner

CONTROLLING THE AUTOMATIC STARTING OF A MOTOR VEHICLE UPHILL IN A μ SPLIT SITUATION

CROSS-REFERENCE TO RELATED APPLICATIONS

This application claims foreign priority benefits under 35 U.S.C. § 119(a)-(d) to DE Application 10 2017 212 385.0 filed Jul. 19, 2017, which is hereby incorporated by reference in its entirety.

TECHNICAL FIELD

The present invention relates to a method and to a device for controlling the automatic starting of a motor vehicle, comprising an electronically controllable locking differential, on a slope or uphill in μ split situation. The invention also relates to a motor vehicle having an electronically controllable locking differential

BACKGROUND

During the process of starting uphill in μ split situations, i.e. when differing coefficients of friction of the underlying surface are present at the wheels at the left-hand and right-hand sides of the vehicle, critical situations with respect to the stability of the vehicle can occur depending on how the drive torque engages at the wheels. In particular, the capability of the vehicle to move forward in the desired direction can be adversely affected.

Most motor vehicles which are currently commercially available have an open differential and are equipped with an ESP (Electronic Stability Control system), with a traction control system (ETC—Engine Traction Control) and with a brake traction control system which simulates a locking differential using brake pressure on the slipping wheel. Vehicles with electronically controllable locking differentials are now also available.

An imprecise locking torque can easily bring about an undesired movement of the vehicle irrespective of the locking device on the drive axle. It is necessary to take into account the fact that in the case of a vehicle start uphill in a μ split situation, in particular with a manual transmission, it is very easy to apply an excessively large torque to the drive train, in particular if only part of the drive torque can be converted into propulsion by lack of grip.

The excess torque causes either one of the wheels or both of the wheels of the respective axis to spin, as a result of which the lateral and longitudinal forces which are available as a result of the spinning wheels or the spinning wheel are greatly reduced. If the wheel with the high coefficient of friction of the underlying surface on the drive axle starts to spin, the lateral stability of the axle is adversely affected and the vehicle begins to carry out a yawing movement as a result of gravity and the non-uniform drive forces acting at the driven wheels. These effects can give rise to the following situations. If an excessively low locking torque is applied to the electronically controllable locking differential there is a risk of the motor vehicle rolling back downhill, since sufficient drive torque has not been shifted from the driven wheel with the low coefficient of friction of the underlying surface to the driven wheel with the high coefficient of friction of the underlying surface. The application of an excessively high locking torque to the electronically controllable locking differential can have the following effects: if the drive axle points uphill, that is to say for example a motor vehicle with front wheel drive drives uphill, the vehicle begins a yawing movement about the lower axle, for example the rear axle, similarly to an inverse pendulum. Once this movement has begun, it is difficult to stop it, and the vehicle will become positioned transversely with respect to the underlying surface, or in the worst case slip downhill in a rotating movement. This situation is impossible to control. In the event of the axle which is not the driven axle pointing uphill, for example in the case of a motor vehicle with front wheel drive which drives rearward uphill, the motor vehicle begins a yawing movement about the higher axle, similarly to a normal pendulum. Furthermore, there is a risk of rolling back downhill if the longitudinal force of the driven wheels is reduced by the excess spinning.

The abovementioned examples show that it is significant to apply the correct level of locking torque to the electronically controllable locking differential and to do this at the correct time. Furthermore, it is crucial to regulate the functional conditions of the driven wheel with the high coefficient of friction of the underlying surface carefully, since excessively large or excessively small locking torques can have negative consequences.

Document DE 10 2006 021 652 A1 describes a device and a method for assisting a starting process from a stationary state of a motor vehicle when a μ split situation is present. In this context it is proposed that when the presence of coefficients of friction of the underlying surface which are different between sides is detected, the brake pressure is reduced in a wheel brake which is assigned to a driven wheel on the side of the underlying surface with the high coefficient of friction of the underlying surface, while in the wheel brake which is assigned to a driven wheel on the side of the vehicle with the low coefficient of friction of the underlying surface a brake pressure is maintained.

DE 10 2015 212 948 A1 describes a method for improving the acceleration behavior of the vehicle. In this context, a braking torque acting on a driven wheel of the vehicle is brought about using a stability control system, in order to reduce a slip of the driven wheel. Furthermore, indices are determined to express that a first driven wheel of the vehicle is on a first side of the underlying surface which permits lower frictional engagement with the first driven wheel than a second side of the underlying surface with a second driven wheel of the vehicle

SUMMARY

A method for controlling a vehicle includes, while the vehicle is stationary, setting an initial locking torque of an electronic limited slip differential based on a road gradient, and, after vehicle movement is detected, setting the locking torque based on a slip ratio of a slowest driven wheel. The slip ratio $SR_{xx}$ may be calculated according to $SR_{xx}=(V_{xx}-V_{Ref})/V_{Crit}$ in response to a reference velocity $V_{Ref}$ being between 0 and a critical velocity $V_{Crit}$, and according to $SR_{xx}=(V_{xx}-V_{Ref})/V_{Ref}$ in response to the reference velocity being greater than the critical velocity. The initial locking torque may be greater than a lower limiting value of torque capacity required for the vehicle to travel uphill at the road gradient with only one driven wheel being powered. The initial locking torque may be less than an upper limiting value of torque capacity such that powertrain torque does not cause the slowest driven wheel to spin. The locking torque may be maintained in response to the slip ratio being within a range of permissible slip ratios. The locking torque may be reduced in response to the slip ratio increasing above a maximum permissible slip ratio. The locking torque may be increased in response to the slip ratio decreasing below a minimum permissible slip ratio.

A vehicle control system includes sensors and a controller. The sensors determine a road gradient and a driven wheel speed. The controller is programmed to, while the vehicle is stationary, set an initial locking torque of an electronic limited slip differential based on the road gradient, and, in response to detecting vehicle movement, set the locking torque based on a slip ratio of a slowest driven wheel. The controller may calculate the slip ratio $SR_{xx}$ for the slowest driven wheel according to $SR_{xx}=(V_{xx}-V_{Ref})/V_{Crit}$ in response to a reference velocity $V_{Ref}$ being between 0 and a critical velocity $V_{Crit}$, and according to $SR_{xx}=(V_{xx}-V_{Ref})/V_{Ref}$ in response to the reference velocity being greater than the critical velocity.

DETAILED DESCRIPTION

Figure 1:
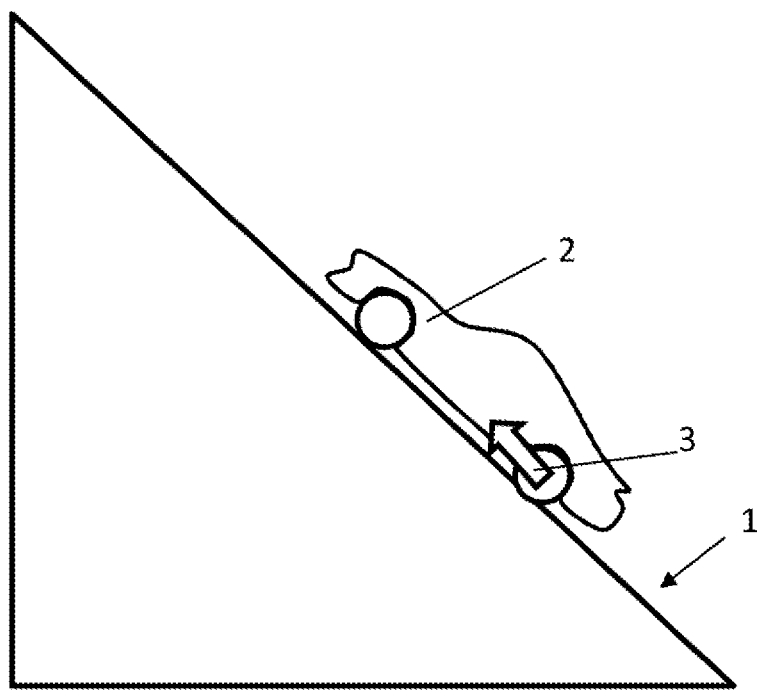
FIG. 1 shows a schematic view from the side of a motor vehicle starting on a slope.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The method according to the invention for controlling the automatic starting of a motor vehicle uphill or on a slope relates to a motor vehicle which comprises an electronically controllable, in particular electronically closed-loop controllable, locking differential. The method relates to a μ split situation in which a first coefficient of friction of the underlying surface is present at a first driven wheel, and a second coefficient of friction of the underlying surface is present at a second driven wheel. In this context, the first coefficient of friction of the underlying surface is higher than the second coefficient of friction of the underlying surface. The method comprises the following steps: Firstly, the positive gradient or the rise of the underlying surface and the orientation of the motor vehicle are determined. Subsequently, an initial locking torque is defined on the basis of the determined positive gradient and on the basis of a component, for example a percentage, of the torque which the vehicle requires to travel uphill with only the first driven wheel powered.

The locking torque of the electronically controllable locking differential is defined on the basis of the slip ratio of the first driven wheel, in particular when the vehicle starts and the wheels begin to spin. After the critical velocity $V_{Crit}$ has been reached, the system can go over to other functions. The subsequent functional control of the locking torque can take place exclusively on the basis of the drive train torque. After the vehicle starts, the locking torque can be adjusted on the basis of the slip ratio of the first driven wheel and the initial locking torque, in particular in order to ensure the stability and traction of the vehicle.

The slip ratio $SR_{xx}$ for the first driven wheel xx is calculated according to $SR_{xx}=(V_{xx}-V_{Ref})/V_{Crit}$ if the reference velocity $V_{Ref}$ lies between zero and a critical velocity $V_{Crit}$ ($0<V_{Ref}<V_{Crit}$), and is calculated according to $SR_{xx}=(V_{xx}-V_{Ref})/V_{Ref}$ if the reference velocity $V_{Ref}$ is higher than the critical velocity $V_{Crit}$ ($V_{Ref}>V_{Crit}$). In this context, $V_{xx}$ is the rotational speed of the driven wheel and $V_{Ref}$ is the rotational speed of a non-driven, simultaneously rotating wheel. This is typically the minimum rotational speed of the non-driven axle in a vehicle with two-wheel drive. The critical velocity $V_{Crit}$ characterizes the rotational speed up to which the slip ratios are stabilized, that is to say the stability of the motor vehicle is ensured.

The term control can basically also comprise closed-loop control within the scope of the present invention.

The described method has the advantage that when starting uphill in μ split situations the starting behavior of the motor vehicle is optimized and rolling back of the motor vehicle is minimized, while at any time the stability of the vehicle has priority. In this way, undesired yawing movements of the motor vehicle are avoided.

The solution proposed by the present invention can be used as a replacement for a brake-based electronic stability control system in conjunction with starting on a slope, or else as a fallback option. The method according to the invention can preferably be used in combination with a traction control system. There is basically no need here for a traction control system in conjunction with the method according to the invention with respect to the stability of the vehicle.

In one advantageous variant, the positive gradient is determined using a longitudinal acceleration sensor, for example when the vehicle is stationary. This sensor can be a component of a stability control device (ESP).

The initial locking torque is preferably defined between an upper limiting value and a lower limiting value. Here, the lower limiting value can be selected such that rolling downhill of the motor vehicle is minimized or ruled out. The upper limiting value can be selected such that when the clutch is released the first driven wheel does not spin and/or only the second driven wheel rotates. Such a refinement has the advantage that the reaction speed is significantly improved compared to a brake-based electronic stability control system, in particular since preventive torque cannot be defined within the scope of a brake-based electronic stability control system.

The locking torque can be defined by means of an open-loop or closed-loop control process. Furthermore, a range of additional slip ratios can be defined, the first driven wheel making available sufficient force to move the vehicle uphill, and at the same time lateral stability being ensured. In other words, the range of permissible slip ratios can be defined to the effect that the boundary conditions that the first driven wheel makes available sufficient force to move the motor vehicle uphill and that the lateral stability of the motor vehicle is ensured, are met. In this way, undesired yawing movements are avoided.

The defined range can be used, in particular, as a trailing range. For example, the current blocking torque should be maintained if the tire lies within the range of permissible slip ratios. The definition of a permissible slip ratio range in which the lateral stability of the tire is ensured, and laterally acting forces are sufficiently taken into account, has the advantage compared to a system with just one fixed locking torque, that the specifically present situation is reacted to or can be allowed for more flexibly.

In one advantageous variant, the locking torque is maintained if the slip ratio of the first driven wheel lies within the range of permissible slip ratios. The locking torque is permissibly or alternatively reduced if the slip ratio of the first driven wheel lies above the range of permissible slip ratios. Additionally or alternatively to this, the locking torque is increased if the slip ratio of the first driven wheel lies below the range of permissible slip ratios. The increasing or reducing of the locking torque can be carried out by means of proportional control.

Within the scope of the method according to the invention it is possible to apply a traction control system. An electronic stability control system can be assisted by a traction control system. If appropriate, the traction control system can replace the electronic stability control system in this situation. The method according to the invention has the following positive points and advantages with respect to the advantages mentioned above:

In comparison with brake-based electronic stability control solutions, rolling back during starting is avoided or reduced more effectively. Furthermore, larger yaw angles are possible with electronic stability control systems. This can be attributed to the relative inaccuracy of the brake pressure at the braking torque interface in the case of a brake-based electronic stability control system. A further reason is that it is not possible to define preventive locking torques on the basis of the positive gradient, which increases the reaction time. Fixed locking torques in the case of electronic locking differentials result in extended yawing movements which are, in particular, obvious when a vehicle with rear wheel drive drives rearward uphill, or a vehicle with front wheel drive drives forward uphill. Basically, the present invention makes available a solution which is adapted to the respective driving situation, in particular to the specifically present positive gradient, the slip ratio and the respective direction of travel, and adjusted individually.

The present invention has, in comparison with a brake-based electronic stability control system, in particular the advantage that the risk of rolling back during starting is reduced or ruled out by the possibility of defining an initial locking torque before the wheels begin to spin. Rolling back is defined as the distance which the vehicle rolls downhill before sufficient drive is generated for an uphill movement. A further advantage in comparison with a brake-based electronic stability control system is the smaller yawing movement, since the electronically controlled differential lock permits, depending on the design, a relatively slow and precise adjustment of the locking torque. This in turn reduces the yawing movement and the acceleration.

Compared to solutions with a fixed locking torque, the present invention has the advantage that it is adaptive and prevents an excessive yawing movement. As a result, the stability of the vehicle is ensured and maintained. Basically, a fixed locking torque can either bring about an excessive yawing movement, that is to say a rotating vehicle, or insufficient drive power on positive gradients. In contrast, the present invention adapts to the friction of the specific underlying surface, the rising or the positive gradient of the underlying surface, the grip of the wheels and the load conditions of the vehicle and controls the correspondingly necessary drive, that is to say the driving force or the motive force of the vehicle, in a way which is adapted to the specific situation.

The device according to the invention for controlling the automatic starting of a motor vehicle uphill in a μ split situation, in which a first coefficient of friction of the underlying surface is present at a first driven wheel, and a second coefficient of friction of the underlying surface is present at a second driven wheel, the first coefficient of friction of the underlying surface being higher than the second coefficient of friction of the underlying surface, comprises a means for determining the positive gradient or the rising of the underlying surface. The device also comprises a means for defining an initial locking torque on the basis of the determined positive gradient and on the basis of a component, for example a percentage, of the torque which the vehicle requires to drive uphill with only the first driven wheel powered. Furthermore, the device comprises a means for calculating the slip ratio $SR_{xx}$ for the wheel xx according to $SR_{xx}=(V_{xx}-V_{Ref})/V_{Crit}$ if the reference velocity $V_{Ref}$ lies between 0 and a critical velocity $V_{Crit}$, and according to $SR_{xx}=(V_{xx}-V_{Ref})/V_{Ref}$ if the reference velocity $V_{Ref}$ is higher than the critical velocity $V_{Crit}$. The device additionally comprises a means for defining the locking torque on the basis of the slip ratio of the first driven wheel. The device according to the invention is preferably configured to carry out a method according to the invention as described above.

The motor vehicle according to the invention comprises an electronically controllable, in particular electronically closed-loop controllable, locking differential and a device as described above. In one advantageous variant, the motor vehicle according to the invention comprises an electronic stability control system and/or a traction control system.

The motor vehicle according to the invention can have a two-wheel drive or an all-wheel drive.

The device according to the invention and the motor vehicle according to the invention have the properties and advantages which are described in relation to the method according to the invention.

Further features, properties and advantages of the present invention are described in more detail below on the basis of exemplary embodiments and with reference to the appended figures. All the features described above and below are advantageous both individually and in any desired combination with one another. The exemplary embodiments which are described below merely constitute examples which, however, do not limit the subject matter of the invention.

Against this background, the object of the present invention is to make available an advantageous method for controlling the automatic starting of a motor vehicle, comprising an electronically controllable locking differential, uphill in a μ split situation, and a device which is suitable for this purpose, and a correspondingly advantageous motor vehicle.

Figure 2:
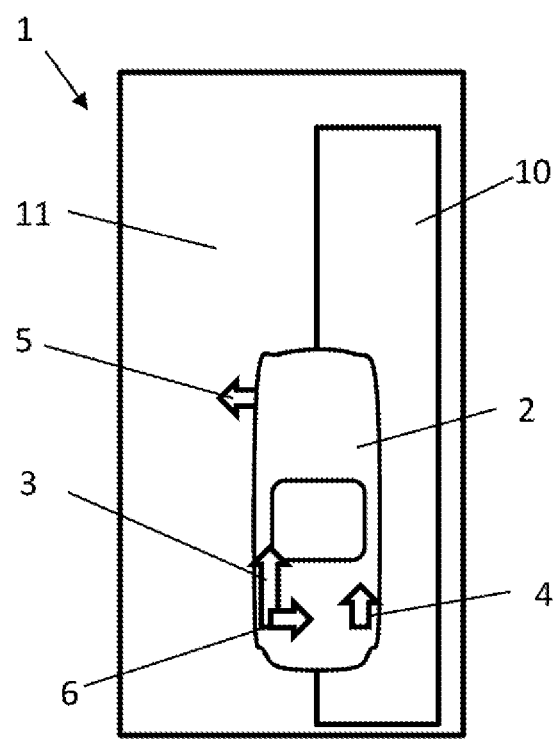
FIG. 2 shows a schematic view from above of the motor vehicle shown in FIG. 1.

FIG. 1 shows an underlying surface 1, which has a positive gradient or a rise. A motor vehicle 2 with a rear wheel drive is driving forward uphill on the underlying surface 1. The arrow 3 characterizes the comparatively high force vector which is applied by the rear wheel with a low level of slip. FIG. 2 shows that the right-hand side 10 of the underlying surface with respect to the vehicle 2 has a low coefficient of friction of the underlying surface, while the left-hand half 11 of the underlying surface with respect to the vehicle 2 has a high coefficient of friction of the underlying surface. There is therefore a μ split situation present. In this situation, the left-hand rear wheel applies during starting a higher force, illustrated by the force vector 3, and the right-hand rear wheel applies a lower force illustrated by the vector 4, than the left-hand rear wheel. This can be attributed to the fact that the right-hand rear wheel has higher slip than the left-hand rear wheel owing to the different coefficients of friction of the underlying surface.

Owing to the different force vectors 3 and 4, there is the risk of a yawing movement. The resulting yawing movement is compensated in the example shown in FIG. 2 by the lateral forces 5 and 6, and a yawing movement is therefore avoided. The example shown in FIGS. 1 and 2 relates to a specifically set locking torque. In this case, the locking torque is equal to the value of the drive torque of the wheel with the high coefficient of friction of the underlying surface, in the example shown the left-hand rear driven wheel at which the lateral stability of the motor vehicle 2 can be maintained. An excessive torque from the engine, in particular after a drive open-loop or closed-loop control process, is compensated by the driven wheel with the low coefficient of friction of the underlying surface, in the present example the right-hand rear driven wheel. In the example shown, the vehicle accelerates in a fault-free fashion without a yawing movement.

Figure 3:
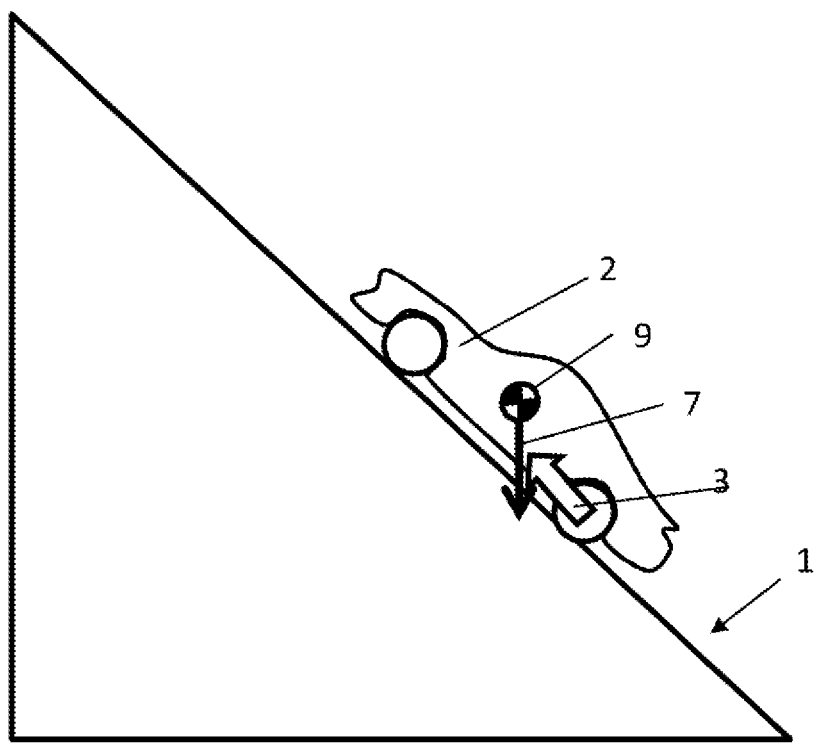
FIG. 3 shows a schematic view from the side of a motor vehicle starting on a slope.
Figure 4:
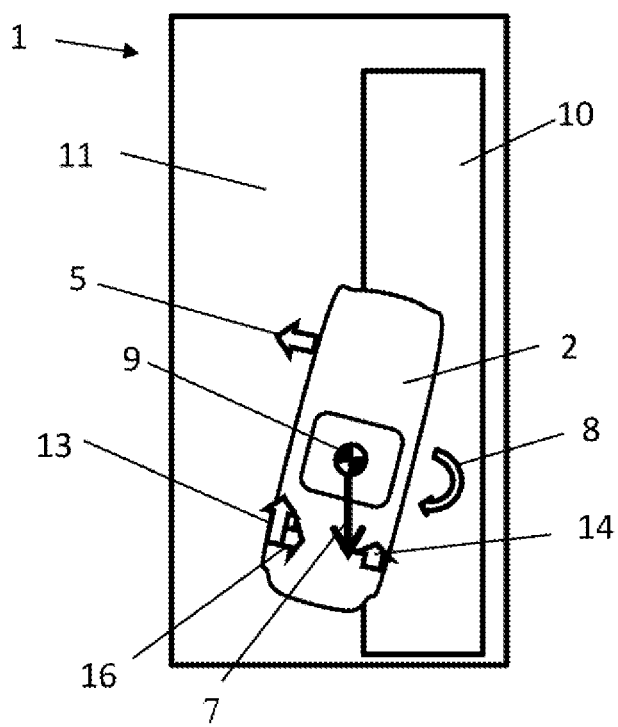
FIG. 4 shows a schematic view from above of the motor vehicle shown in FIG. 3.

FIGS. 3 and 4 show an example of excessive slip for the case in which the drive axle points downhill, that is to say is lower than the non-driven axle. FIG. 3 shows a motor vehicle 2 during starting uphill or on a slope. The vehicle 2 has a rear wheel drive and is traveling forward uphill. In FIG. 3 the vehicle is shown schematically from the side. The vehicle shown in FIG. 3 is shown from above in FIG. 4. The center of gravity of the motor vehicle 2 is defined by the reference number 9. The gravity acting at the center of gravity of the motor vehicle is defined by a vector 7.

In the example shown in FIGS. 3 and 4, the two rear wheels spin owing to an excessively high drive torque and an excessively high locking torque. The rear axle loses the longitudinal and lateral driving capability, or they are significantly reduced, as indicated by the arrows 13 and 14. At the same time, the lateral force of the left-hand rear wheel 16 which is necessary to compensate a yawing movement is reduced. Owing to gravity, the vehicle 2 rotates about the front wheel with the high coefficient of friction of the underlying surface, in the example shown about the left-hand front wheel. A movement which is comparable to a pendulum is brought about. This yawing movement can occur suddenly. It is indicated by an arrow 8 and can be attributed, on the one hand, to gravity 7 and, on the other hand, to the unequal driving forces 13 and 14.

Figure 5:
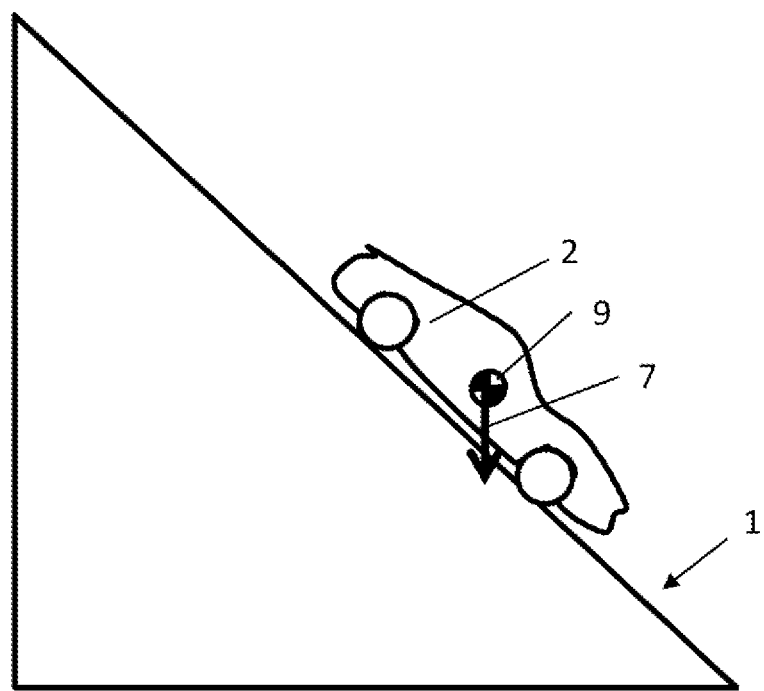
FIG. 5 shows a schematic view from the side of a motor vehicle starting on a slope.
Figure 6:
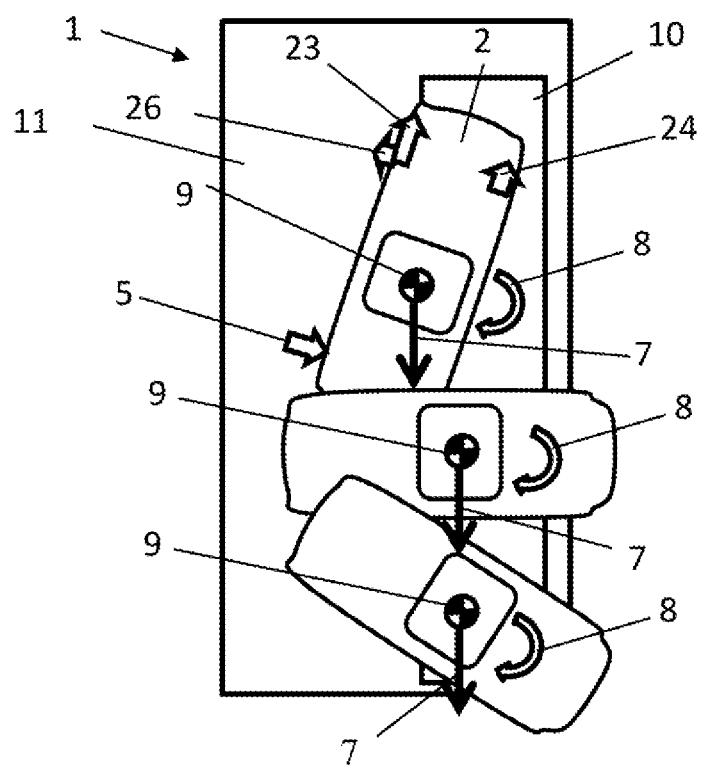
FIG. 6 shows a schematic view from above of the motor vehicle shown in FIG. 5, in various positions.

FIGS. 5 and 6 show schematic views of a vehicle which has a rear wheel drive and is driving rearward uphill. The drive axle is therefore directed uphill or is higher than the non-driven axle. In FIG. 5, the vehicle is shown schematically from the side. In FIG. 6, the vehicle is shown schematically from above. In the example shown, both rear wheels spin during starting.

The rear axle loses the longitudinal and lateral driving capabilities or they are significantly reduced, as indicated by the arrows 23 and 24. At the same time, the lateral force of the left-hand rear wheel 26 which is necessary to compensate a yawing movement is reduced. The vehicle 2 subsequently begins to rotate about the front wheel with the high coefficient of friction of the underlying surface. This yawing movement can be attributed, on the one hand, to gravity 7 and, on the other hand, to the unequal driving forces 23 and 24. The vehicle consequently behaves like an inverse pendulum and slides uncontrollably downhill.

Figure 7:
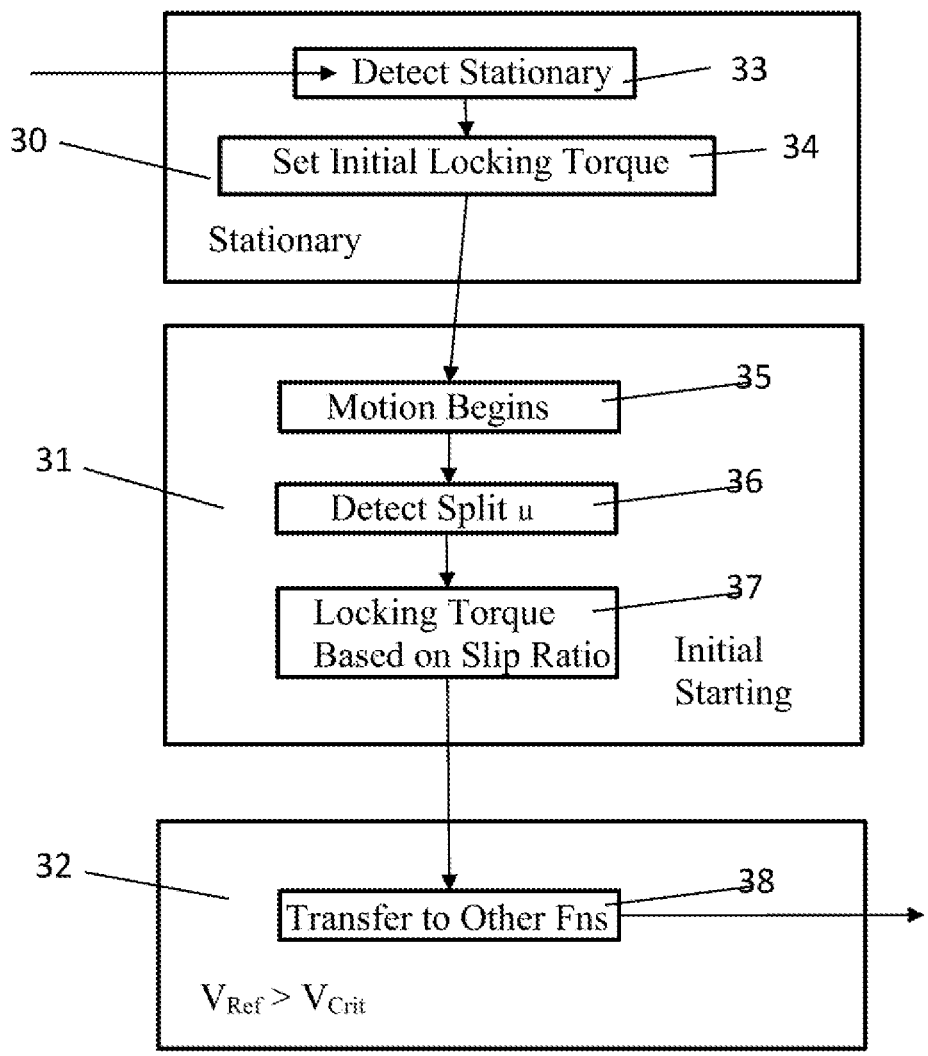
FIG. 7 shows a schematic view of a variant of the method according to the invention in the form of a flowchart.

Within the scope of the method according to the invention, the generation of a situation shown in FIGS. 3 to 6 is prevented. An example of a variant of the method according to the invention is shown schematically in the form of a flowchart in FIG. 7. The block 30 indicates the stationary motor vehicle. The block 31 indicates the initial starting. The block 32 indicates the vehicle which is driving above the critical velocity $V_{Crit}$.

In step 33 is it detected that the vehicle is stationary. In step 34, an initial locking torque is subsequently defined on the basis of the positive gradient of the underlying surface and the orientation of the vehicle. In step 35, the accelerator pedal is subsequently activated, the clutch engaged and the tires begin to move. In step 36 a μ split situation is detected and the hill start function is started.

In step 37, the locking torque is defined or open-loop or closed-loop controlled on the basis of the slip ratio of the driven wheel with the relatively high coefficient of friction of the underlying surface. The slip ratio $SR_{xx}$ for the first driven wheel xx is calculated according to $SR_{xx}=(V_{xx}-V_{Ref})/V_{Crit}$ if the reference velocity $V_{Ref}$ lies between zero and a critical velocity $V_{Crit}$ ($0<V_{Ref}<V_{Crit}$), and calculated according to $SR_{xx}=(V_{xx}-V_{m})/V_{Ref}$ if the reference velocity $V_{Ref}$ is higher than the critical velocity $V_{Crit}$ ($V_{Ref}>V_{Crit}$).

In this context, a proportional control can take place within a range of permissible slip ratios. In step 38, the transfer to other functions takes place.

Figure 8:
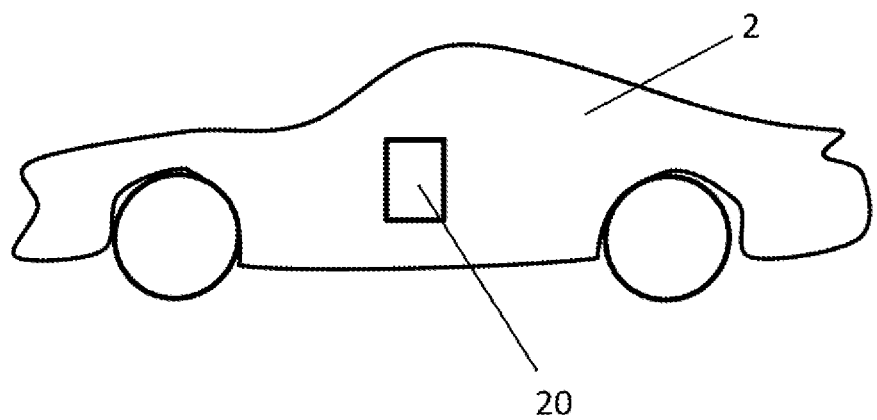
FIG. 8 shows a schematic view of a motor vehicle according to the invention.

FIG. 8 shows a schematic view of a motor vehicle 2 according to the invention which is equipped with an electronic locking differential and comprises a control device 20 according to the invention. The device 20 according to the invention is configured to carry out a method according to the invention. It comprises, in particular, a means for determining the positive gradient or the rising of the underlying surface, a means for defining an initial locking torque, a means for calculating the slip ratio and a means for defining the locking torque on the basis of the slip ratio. The motor vehicle can basically be a passenger car, a truck or some other vehicle. The motor vehicle preferably has a two-wheel drive.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A method for controlling a vehicle comprising:
   while the vehicle is stationary, setting an initial locking torque of an electronic limited slip differential based on a road gradient; and
   after vehicle movement is detected, setting the locking torque based on a slip ratio of a slowest driven wheel, wherein the slip ratio $SR_{xx}$ for the slowest driven wheel is calculated according to
   $SR_{xx}=(V_{xx}-V_{Ref})/V_{Crit}$ in response to a reference velocity $V_{Ref}$ being between 0 and a critical velocity $V_{Crit}$, and according to
   $SR_{xx}=(V_{xx}-V_{Ref})/V_{Ref}$ in response to the reference velocity being greater than the critical velocity.

2. The method of claim 1 wherein the initial locking torque is greater than a lower limiting value of torque capacity required for the vehicle to travel uphill at the road gradient with only one driven wheel being powered.

3. The method of claim 1 wherein the initial locking torque is less than an upper limiting value of torque capacity such that powertrain torque does not cause the slowest driven wheel to spin.

4. The method of claim 1 wherein:
   the locking torque is maintained in response to the slip ratio being within a range of permissible slip ratios;
   the locking torque is reduced in response to the slip ratio increasing above a maximum permissible slip ratio; and
   the locking torque is increased in response to the slip ratio decreasing below a minimum permissible slip ratio.

5. A vehicle control system comprising:
   sensors for determining a road gradient and a driven wheel speed; and
   a controller programmed to
      while the vehicle is stationary, set an initial locking torque of an electronic limited slip differential based on the road gradient; and
      in response to detecting vehicle movement, set the locking torque based on a slip ratio of a slowest driven wheel, wherein the slip ratio $SR_{xx}$ for the slowest driven wheel is calculated according to
      $SR_{xx}=(V_{xx}-V_{Ref})/V_{Crit}$ in response to a reference velocity $V_{Ref}$ being between 0 and a critical velocity $V_{Crit}$, and according to
      $SR_{xx}=(V_{xx}-V_{Ref})/V_{Ref}$ in response to the reference velocity being greater than the critical velocity.

6. The control system of claim 5 wherein the initial locking torque is greater than a lower limiting value of torque capacity required for the vehicle to travel uphill at the road gradient with only one driven wheel being powered.

7. The control system of claim 5 wherein the initial locking torque is less than an upper limiting value of torque capacity such that powertrain torque does not cause the slowest driven wheel to spin.

8. The control system of claim 5 wherein the controller is programmed to:
   maintain the locking torque in response to the slip ratio being within a range of permissible slip ratios;
   reduce the locking torque in response to the slip ratio increasing above a maximum permissible slip ratio; and
   increase the locking torque in response to the slip ratio decreasing below a minimum permissible slip ratio.

9. A vehicle comprising:
   a first axle having first and second driven wheels;
   a second axle having third and fourth wheels;
   an electronic limited slip differential connected between the first and second driven wheels, wherein the differential is configured to control rotation of the first and second driven wheels based on a locking torque of the differential; and
   a controller programmed to
      while the vehicle is stationary, set an initial valve for the locking torque based on a road gradient, wherein the initial locking torque is greater than a lower limiting value of torque capacity required for the vehicle to travel uphill at the road gradient with only one of the driven wheels being powered, and the initial locking torque is less than an upper limiting value of torque capacity such that powertrain torque does not cause the slowest of the driven wheels to spin; and
      in response to detecting vehicle movement and detecting a mu split condition in which the first wheel has a higher coefficient of friction with the road than the second wheel, adjust the locking torque based on a slip ratio of the first wheel, wherein the slip ratio of the first wheel is based on a ratio of a speed of the first wheel and a critical velocity if a speed of a slower of the third and fourth wheels is between 0 and the critical velocity, and is based on a ratio of the speed of the first wheel and the speed of the slower of the third and fourth wheels if the speed of the slower of the third and fourth wheels is greater than the critical velocity.

10. The vehicle of claim 9 wherein the controller is programmed to calculate the slip ratio according to
    Slip ratio=the speed of the first wheel minus the speed of the slower of the third and fourth wheels divided by the critical velocity if the speed of the slower of the third and fourth wheels is between 0 and the critical velocity and according to
    Slip ratio=the speed of the first wheel minus the speed of the slower of the third and fourth wheels divided by the speed of the slower of the third and fourth wheels if the speed of the slower of the third and fourth wheels is greater than the critical velocity.

11. The vehicle of claim 9 wherein the controller is programmed to:
    maintain the locking torque in response to the slip ratio being within a range of permissible slip ratios;
    reduce the locking torque in response to the slip ratio increasing above a maximum permissible slip ratio; and
    increase the locking torque in response to the slip ratio decreasing below a minimum permissible slip ratio.

* * * * *